United States Patent [19]
Park et al.

[11] Patent Number: 5,914,294
[45] Date of Patent: Jun. 22, 1999

[54] ADSORPTIVE MONOLITH INCLUDING ACTIVATED CARBON AND METHOD FOR MAKING SAID MONLITH

[75] Inventors: Minwoo Park, Lilburn; Frank R. Rhodes; Jack H. L'Amoreaux, both of Lawrenceville, all of Ga.; Frederick S. Baker, Wando, S.C.; Robert K. Beckler, Lexington; John C. McCue, Covington, both of Va.

[73] Assignees: Applied Ceramics, Inc., Doraville, Ga.; Westvaco Corporation, New York, N.Y.

[21] Appl. No.: 08/636,700

[22] Filed: Apr. 23, 1996

[51] Int. Cl.⁶ .............................. B01J 20/02; B01J 21/18; C04B 33/24
[52] U.S. Cl. ..................... 502/417; 502/427; 502/436; 502/180; 501/100; 501/143
[58] Field of Search .................... 502/417, 427, 502/436, 180; 501/100, 143

[56] References Cited

U.S. PATENT DOCUMENTS

| | | | |
|---|---|---|---|
| Re. 25,400 | 6/1963 | Doying | 252/428 |
| 617,079 | 1/1899 | Catlett . | |
| 1,524,843 | 2/1925 | Ruprecht . | |
| 1,589,081 | 6/1926 | Adler | 502/80 |
| 1,985,840 | 12/1934 | Sadtier | 131/31 |
| 2,108,860 | 2/1938 | Kauffman | 131/31 |
| 2,391,312 | 12/1945 | Ewing et al. | 252/235 |
| 2,439,358 | 4/1948 | Divoll | 74/5 |
| 2,439,538 | 4/1948 | Burgess | 252/265 |
| 2,455,509 | 12/1948 | Luaces | 18/55 |
| 2,951,087 | 8/1960 | Hauser | 260/448 |
| 3,089,195 | 5/1963 | Woodburn, Jr. | 18/47.5 |
| 3,454,502 | 7/1969 | Hiltgen et al. | 252/428 |
| 3,592,779 | 7/1971 | Kiikka | 252/421 |
| 3,632,385 | 1/1972 | Schmitt | 117/46 |
| 3,690,634 | 9/1972 | Enya | 266/33 R |
| 3,825,460 | 7/1974 | Yoshikiawa et al. | 156/296 |
| 3,859,421 | 1/1975 | Hucke | 423/445 |
| 3,864,277 | 2/1975 | Kovach | 252/423 |
| 3,891,574 | 6/1975 | Kobayashi et al. | 252/421 |
| 3,927,186 | 12/1975 | Vinton et al. | 423/447 |
| 3,960,761 | 6/1976 | Bürger et al. | 252/421 |
| 3,960,771 | 6/1976 | Tanaka et al. | 252/446 |
| 4,029,600 | 6/1977 | Schmitt, Jr. et al. | 252/444 |
| 4,051,098 | 9/1977 | Takemura et al. | 260/38 |
| 4,058,483 | 11/1977 | Henbest | 252/446 |
| 4,124,529 | 11/1978 | Jüntgen et al. | 252/421 |
| 4,220,553 | 9/1980 | Krause | 252/428 |
| 4,225,569 | 9/1980 | Matsui et al. | 423/445 |
| 4,259,299 | 3/1981 | Hagiwara et al. | 423/210 |
| 4,338,106 | 7/1982 | Mizuno et al. | 55/316 |
| 4,399,052 | 8/1983 | Sugino | 252/421 |
| 4,518,704 | 5/1985 | Okabayashi et al. | 502/80 |
| 4,677,086 | 6/1987 | McCue et al. | 502/62 |
| 4,808,559 | 2/1989 | Sommer et al. | 502/63 |
| 4,923,843 | 5/1990 | Saforo et al. | 502/415 |
| 4,954,469 | 9/1990 | Robinson | 502/80 |
| 4,968,651 | 11/1990 | Crabtree | 502/63 |
| 4,999,330 | 3/1991 | Bose et al. | 502/402 |
| 5,043,310 | 8/1991 | Takeuchi et al. | 502/404 |
| 5,215,690 | 6/1993 | Golino et al. | 264/29.4 |
| 5,306,675 | 4/1994 | Wu et al. | 502/5 |
| 5,356,852 | 10/1994 | DeLiso et al. | 502/402 |
| 5,376,609 | 12/1994 | Guile | 502/62 |
| 5,389,325 | 2/1995 | Bookbinder et al. | 264/177.12 |
| 5,403,809 | 4/1995 | Miller et al. | 502/416 |

FOREIGN PATENT DOCUMENTS

| | | |
|---|---|---|
| 1567491 | 4/1969 | Germany . |
| 59-69146 | 4/1984 | Japan . |
| 2409 | 9/1865 | United Kingdom . |
| 3078 | 9/1865 | United Kingdom . |
| 341233 | 1/1931 | United Kingdom . |

*Primary Examiner*—Glenn Caldarola
*Assistant Examiner*—In Suk Bullock
*Attorney, Agent, or Firm*—Jones & Askew, LLP

[57] ABSTRACT

An adsorptive monolith made by extruding a mixture of activated carbon, a ceramic forming material, a flux material, and water, drying the extruded monolith, and firing the dried monolith at a temperature and for a time period sufficient to react the ceramic material together and form a ceramic matrix. The extrudable mixture may also comprise a wet binder. The monolith has a shape with at least one passage therethrough and desirably has a plurality of passages therethrough to form a honeycomb. The monolith may be dried by vacuum drying, freeze drying, or control humidity drying. The monolith is useful for removing volatile organic compounds and other chemical agents such as ozone from fluid streams. Particularly useful applications include adsorptive filters for removing ozone from xerographic devices and other appropriate office machines and volatile organic compounds from automobile engine air intake systems.

63 Claims, 3 Drawing Sheets

ADSORPTIVE MONOLITH INCLUDING ACTIVATED CARBON AND METHOD FOR MAKING SAID MONLITH

TECHNICAL FIELD

This invention relates to adsorptive monoliths including activated carbon and more particularly to adsorptive monoliths including ceramic material and activated carbon and using said monolith to remove volatile organic compounds, ozone, and other chemical agents from fluid streams.

BACKGROUND OF THE INVENTION

Activated carbon is useful in the removal of chemical agents such as volatile organic compounds from fluid streams and is also useful as a catalyst substrate for special applications. To remove chemical agents from a fluid stream with activated carbon, the fluid stream is directed adjacent the activated carbon. The activated carbon can be in the form of particles in a packed column, a coating on a substrate, a monolith with passages for fluid flow therethrough, and the like.

It is desirable in some activated carbon applications to have a high rate of fluid flow adjacent to the activated carbon and a low level of back pressure. Thus, packed columns of activated carbon are sometimes unsuitable because of the high level of back pressure created. Formed bodies containing activated carbon and having open passages therethrough, such as a honeycomb-shaped activated carbon monolith, are desirable for applications wherein a reasonably high rate of fluid flow and a low level of back pressure are required, but formation of such shapes with a level of strength sufficient to withstand handling and use as an adsorbent filter is problematic. Activated carbon monoliths formed without a binder do not have sufficient strength for some applications.

U.S. Pat. No. 4,518,704 to Okabayashi et al. discloses a formed body comprising activated carbon and a ceramic material. This structure has improved strength properties but Okabayashi teaches firing at a temperature of 1100° C. for a period from 1 to 4 hours to achieve desired bonding and strength. Firing at such a high temperature and for such a long period of time is economically undesirable.

Another problem with making adsorptive monoliths comprising activated carbon and a ceramic material is that it is difficult to extrude a mixture of activated carbon and ceramic forming material without a high level of water in the mixture due to the high porosity of the activated carbon. To successfully extrude a mixture of activated carbon and ceramic forming material into a shape such as a honeycomb, a water content of 30 to 65 percent by weight is required. This moisture must be substantially removed from the extruded monolith before firing to protect the integrity of the formed monolith. A ceramic article subjected to increased temperature during firing, without first having been relieved of most of its moisture content, will usually suffer significant damage in the forms of cracks, pop-outs or explosions due to rapid conversions of its remaining moisture to steam.

Drying of a wet, extruded monolith of ceramic forming material and activated carbon is a sensitive process. An unfired ceramic product generally shrinks as it loses moisture, and a monolith can crack if the rate of moisture loss from the monolith during drying is not uniform throughout the monolith.

Accordingly, there is a need for a formed body comprising activated carbon that can be formed by extrusion, can be dried and fired without cracking, can be fired at more economical conditions such as a lower temperature and a shorter time, has sufficient strength to withstand handling and use as an adsorptive filter, and has a shape which accommodates sufficient fluid flow throughput.

SUMMARY OF THE INVENTION

This invention solves the above-described problems by providing a method of forming an adsorptive monolith comprising extruding an extrudable mixture including an activated carbon, a ceramic forming material, water, and a flux material. The flux material enhances the fusing of the ceramic forming material upon firing by lowering the temperature at which the ceramic forming material fuses and forms ceramic bonds. This allows the monolith to be fired at a lower temperature and for a shorter time. In addition, the invention encompasses methods of drying the wet extruded monolith including vacuum drying, freeze drying, and humidity control drying. Such drying methods allow the wet extruded monolith to be dried without cracking of the monolith.

More particularly, this invention encompasses a method of forming an adsorptive monolith comprising the steps of (a) extruding an extrudable mixture through an extrusion die such that a monolith is formed having a shape wherein the monolith has at least one passage therethrough and the extrudable mixture comprises activated carbon, a ceramic forming material, a flux material, and water, (b) drying the extruded monolith, and (c) firing the dried monolith at a temperature and for a time period sufficient to react the ceramic forming material together and form a ceramic matrix. The extrudable mixture is capable of maintaining the shape of the monolith after extrusion and during drying of the monolith.

A suitable ceramic forming material is ball clay. In addition, the ceramic forming material desirably includes a filler for reducing shrinkage of the monolith during the steps of drying and firing. A suitable filler is calcined kaolin clay.

A suitable flux material is a feldspathic material, particularly, nepheline syenite.

Desirably, the extrudable mixture includes a wet binder for enhancing strength and maintaining the shape of the wet extruded monolith. A particularly suitable wet binder is methylcellulose. Acrylic binders are also suitable and can be used in combination with methylcellulose.

The extrudable mixture can also include sodium silicate which, as a binder, enhances the strength of the monolith during drying and, as a flux material, enhances the strength of the monolith after firing.

Desirably, the adsorptive monolith has a plurality of passages therethrough and is in the shape of a honeycomb.

The extruded monolith may be dried by vacuum drying which includes placing the extruded monolith in a vacuum chamber initially having room ambient temperature and atmospheric pressure within the vacuum chamber, reducing the pressure within the vacuum chamber at a rate and to a level sufficient to freeze the water in the monolith, and maintaining the reduced pressure within the vacuum chamber for a time sufficient for the frozen water to sublime until the monolith is dried. More particularly, the pressure within the vacuum chamber may be reduced, within about 1 minute, from atmospheric pressure to a pressure less than about 1 torr, and desirably within the range from 30 microns to 1 torr.

The method of freeze drying the wet extruded monolith comprises the steps of (1) freezing the water in the extruded monolith, (2) placing the frozen extruded monolith in a vacuum chamber initially having a pressure within the vacuum chamber of atmospheric pressure, (3) reducing the pressure and/or temperature within the vacuum chamber at a rate and to a level sufficient to keep the water in the monolith frozen, and (4) maintaining the reduced pressure and/or temperature within the vacuum chamber for a time sufficient for the frozen water in the monolith to sublime until the monolith is dry. Desirably, during the freezing step, the water in the monolith is frozen within about 10 seconds to 10 minutes after the extrusion step and the monolith is subjected to a temperature of less than about −25° F. More desirably, during the freezing step, the monolith is subjected to a temperature of less than about −80° F.

The method of humidity control drying the wet extruded monolith comprises the steps of (1) placing the extruded monolith in a chamber initially having a relative humidity within the chamber of at least 95 percent and (2) gradually reducing the relative humidity within the chamber until the monolith is dry.

This invention encompasses an adsorptive monolith made according to the foregoing process and a method of removing chemical agents such as volatile organic compounds and ozone from a fluid air stream comprising the step of routing through the adsorptive monolith a fluid stream initially including such a chemical agent.

The adsorptive monolith of this invention comprises ceramic material and activated carbon dispersed throughout the matrix. The ceramic material is reacted together such that a ceramic matrix is formed and the activated carbon is supported by the matrix. The monolith desirably has a plurality of passages therethrough to receive a flow of fluid and is in the shape of a honeycomb. In addition, the monolith desirably has an open frontal area greater than 70% and up to 85% and an axial crushing strength from about 500 to about 1600 psi.

Thus, an object of the present invention is to provide an improved adsorptive monolith comprising activated carbon and an improved method of making such a monolith.

Another object of the present invention is to provide an adsorptive monolith for removing chemical agents such as volatile organic compounds and ozone from fluid streams.

Yet another object of the present invention is to provide an adsorptive monolith with desirable strength characteristics.

Still another object of the present invention is to provide improved methods of drying a wet extruded monolith comprising activated carbon, ceramic forming material, and water.

Other objects, features, and advantages of the invention will become more readily apparent from the following description of embodiments of the invention.

DETAILED DESCRIPTION OF DRAWINGS

Figure 1:
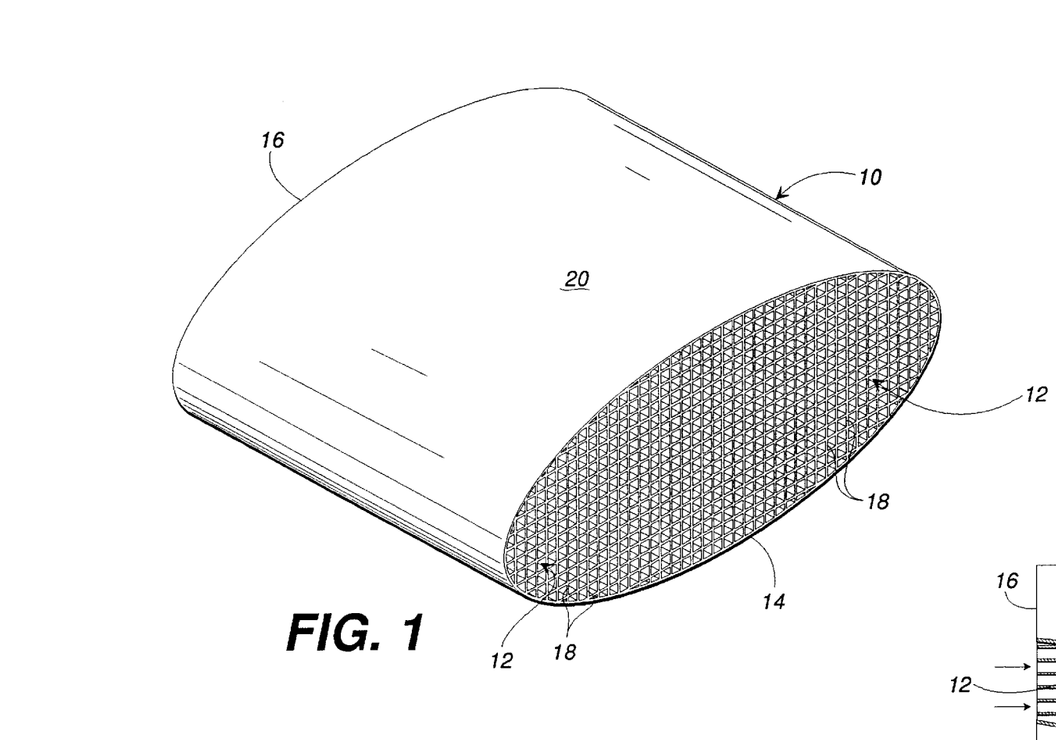
FIG. 1 is a perspective view of an adsorptive monolith made in accordance with an embodiment of this invention.

As summarized above, this invention encompasses an adsorptive monolith comprising activated carbon, a method for making such a monolith including methods for drying the monolith, and methods for adsorbing chemical agents such as volatile organic compounds. As used herein, monolith means a block of solid-phase material. FIG. 1 illustrates a monolith 10 made according to an embodiment of the present invention. The monolith 10 shown in FIG. 1 is an extruded monolith comprising activated carbon and ceramic material and having a honeycomb shape. The monolith has a plurality of passages 12 extending through the monolith from a frontal end 14 to a rearward end 16. The passages 12 are substantially square in cross section, linear along their length, and formed by surrounding walls 18 of the extruded material; however, the passages can have other cross-sectional shapes such as rectangular, round, triangular, hexagonal, oval, eliptical, and the like. The passages 12 are encased by an outer skin 20 of the extruded material.

Figure 2:
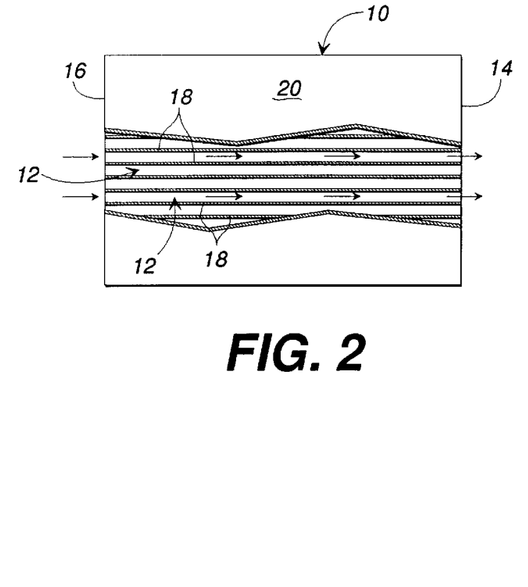
FIG. 2 is a partial side elevation view of the monolith of FIG. 1 with a portion of the skin removed to illustrate the flow of fluid through the honeycomb passages of the monolith.

The monolith 10 is useful as an adsorptive filter to adsorb a variety of chemicals from gaseous or liquid phases and as a catalyst substrate. For example, when the monolith 10 is disposed in the air intake system of a fuel injected internal combustion engine, the activated carbon of the monolith adsorbs fuel vapors that escape from injector ports as fuel leakage when the engine is turned off. When the engine is restarted, incoming air sweeps back through the honeycomb structure and desorbs the fuel. The fuel is then combusted in the engine. FIG. 2 illustrates the flow of fluid through the passages 12 in the monolith 10. The material to be adsorbed is adsorbed by the activated carbon held in the walls of the monolith structure.

In another example, the monolith 10 is positioned in the exhaust air stream of a xerographic device and the activated carbon of the honeycomb structure adsorbs ozone. The ozone is captured by the carbon, and is either converted to oxygen (catalytically) or carbon dioxide (by chemical interaction with the carbon) or held captive long term by adsorption. More probably, combinations of the foregoing actually occur. En any case, the adsorptive monolith or filter removes ozone from the air stream, eliminating the discomfort and possible health hazard which ozone presents to the eyes and respiratory tissues of office workers in the area.

Generally described, the monolith 10 is made by mixing together activated carbon, ceramic forming material, flux material, binder, and water to make an extrudable mixture. The extrudable mixture is extruded through an extrusion die to form the monolith having the honeycomb structure. After extrusion, the extruded honeycomb monolith retains its shape while it is dried and then fired at a temperature and for a time period sufficient to react the ceramic forming materials to form a monolith having activated carbon dispersed throughout the structure and sufficient strength for its intended end use.

Desirably, the method for making the monolith 10 includes first mixing the dry ingredients of the extrudable mixture and then adding the liquid ingredients to the dry mixture; however, the order in which the ingredients are added to the extrudable mixture can be varied by alternating mixing of dry and liquid ingredients as long as the proper amount of moisture is added to make an extrudable mixture which holds its shape during and after extrusion.

The activated carbon is desirably present in the extrudable mixture in an amount from about 20 to about 70 parts, by weight, and more desirably, in an amount from about 30 to about 50 parts, by weight. The activated carbon adsorbs volatile organic compounds and other chemical agents such as ozone. A variety of activated carbons can be used in this invention. The most suitable activated carbon will depend on the intended application, particularly the nature of the material to be adsorbed. Thus, the physical properties of the activated carbon, such as the surface area and the pore structure, may vary depending on the application. Desirably, the activated carbon has a nitrogen B.E.T. surface from about 600 to about 2000 $m^2/g$. More desirably, the activated carbon has a nitrogen B.E.T. surface from about 800 to about 1800 $m^2/g$, and even more desirably has a nitrogen B.E.T. surface from about 1000 to about 1600 $m^2/g$. Suitable activated carbon can also be characterized by having a particle size such that more than 40% by weight of the activated carbon passes through a 325 mesh screen, and more desirably, by having a particle size such that more than 65% by weight of the activated carbon passes through a 325 mesh screen.

Activated carbon suitable for use in the present invention may be made from a variety of precursors including bituminous coal, lignite, peat, synthetic polymers, petroleum pitch, petroleum coke, coal tar pitch, and lignocellulosic materials. Suitable lignocellulosic materials include wood, wood dust, wood flour, sawdust, coconut shell, fruit pits, nut shell, and fruit stones. A particularly desirable commercially available activated carbon is NUCHAR® activated carbon available from Westvaco Corporation of New York, N.Y.

The ceramic forming material is present in the extrudable mixture in an amount from about 20 to about 60 parts, by weight, and more desirably, in an amount from about 30 to about 50 parts, by weight. The term ceramic forming material means alumina/silicate-based material which, upon firing, is capable of reacting together to form a high strength, crystal/glass mixed-phase ceramic matrix. In this application, the reacted ceramic material provides a matrix for supporting the activated carbon and has sufficient strength to withstand handling and use of the monolith in the intended application and maintain its intended shape without cracking or otherwise disintegrating. The ceramic forming material desirably includes a substantial portion of moldable material which is plastic in nature and thus, when mixed with liquid, can be molded or extruded into a shape and will maintain that shape through drying and firing. Such a suitable plastic or moldable material is ball clay. A particularly suitable commercially available ball clay is OLD MINE # 4 ball clay available from Kentucky-Tennessee Clay Company of Mayfield, Ky. Other suitable plastic-like ceramic forming materials include plastic kaolins, smectite clay minerals, bentonite, and combinations thereof. Bentonite and smectites are desirably used in combination with ball clay or kaolin.

The ceramic forming material also desirably includes a filler material which is non-plastic and reduces shrinkage of the monolith during the steps of drying and firing. Such a suitable ceramic filler is calcined kaolin clay. A particularly suitable commercially available calcined kaolin clay is Glomax LL available from Georgia Kaolin Company, Inc. of Union, N.J. The filler desirably is present in the extrudable mixture in an amount up to about 15 parts, by weight, more desirably, from about 1 to about 15 parts, by weight, and even more desirably, from about 3 to about 10 parts, by weight. Other suitable filler materials include calcined kyanite, mullite, cordierite, clay grog, silica, alumina, and other calcined or non-plastic refractory ceramic materials and combinations thereof.

The flux material is present in the extrudable mixture in an amount from about 4 to about 20 parts, by weight, and aids in forming the ceramic bond between the ceramic forming materials by causing the ceramic forming material particles to react together and form a ceramic matrix at a lower firing temperature than if the flux material was not present. More desirably, the flux material is present in the extrudable mixture in an amount from about 4 to about 10 parts, by weight. Suitable flux materials include feldspathic materials, particularly nepheline syenite and feldspar, spodumene, soda, potash, sodium silicate, glass frits, other ceramic fluxes, and combinations thereof. A particularly desirable commercially available flux material is MINEX® Nepheline Syenite available from Unimin Specialty Materials, Inc. of Elco, Ill.

The wet binder is present in the extruded mixture in an amount from about 0.5 to about 5 percent, by weight, based on the solids content of the binder, and enhances the strength of the monolith after extrusion so that the extruded monolith maintains its shape after extrusion and through drying and firing. The wet binder is desirably present in the extruded mixture in an amount from about 1 to about 3 percent, by weight, based on the solids content of the binder. A particularly suitable wet binder is methylcellulose and a suitable commercially available methylcellulose is METHOCEL A4M methylcellulose available from Dow Chemical Company of Midland, Mich. Desirably, methylcellulose is present in the extrudable mixture in an amount from about 0.5 to about 5 parts, by weight, of the extrudable mixture, and more desirably, from about 1 to about 3 parts, by weight Another suitable binder, used in combination with methylcellulose, is an acrylic binder. Examples of such polymers are JONREZ D-2106 and JONREZ D-2104 available from Westvaco Corporation of New York, N.Y. and Duramax acrylic binder which is available from Rlohm & Haas of Montgomeryville, Pa. The acrylic polymer, having a medium to high glass transition temperature, is desirably present in an amount up to about 4 parts, by weight, of the extrudable mixture, based on the solids content of the acrylic binder and more desirably is present in an amount from about 1 to about 4 parts, by weight, of the extrudable mixture, based on the solids content of the acrylic binder. Other suitable binders include hydroxypropyl methylcellulose polymers, CMC, polyvinyl alcohol, and other temporary binder/plasticizer additives.

Another desirable component of the extrudable mixture is sodium silicate which increases the strength of both the dry, but unfired monolith and the fired monolith, and is a flux material. The sodium silicate is thus both a binder when the monolith is in the dry state and a flux material, and is added to the extrudable mixture as a solution. The sodium silicate is desirably present in the extrudable mixture in an amount up to about 7 parts, by weight, based on the solids content of the sodium silicate, and more desirably in an amount from about 2 to about 7 parts, by weight, based on the solids content of the sodium silicate. A suitable commercially available sodium silicate solution is a 40% solids, Type N solution, available from PQ Corporation, Industrial Chemicals JDivision, Valley Forge, Pa. Other suitable binders for the dried monolith include silica sol and alumina sol.

The extrudable mixture includes water in an amount sufficient to make an extrudable mixture and desirably includes from about 60 to about 130 parts water, by weight. Preferably, the water is chilled before it is added to the mixture and more preferably is added to the system at or near 0° C. This low temperature helps keep the ingredients cool during mixing, and helps to overcome any exotherm which may occur as a result of mixing the ingredients, or as a result of heating of the mixture, which occurs as a result of the mechanical action of mixing.

The extrudable mixture is formed into a shape which will be the shape of the final monolith by passing the extrudable mixture through an extrusion die. The monolith has a block shape and includes at least one passageway along its length and desirably includes a plurality of passageways extending along the length of the monolith. The monolith is designed to be placed in the stream of a fluid containing a material to be adsorbed such that the fluid is forced through the passages in the monolith. Edeally, the amount of internal surface area of the monolith exposed to the fluid is maximized to maximize the efficiency of the adsorption. A honeycomb-shaped structure is preferred for the monolith. Honeycomb extruders are known in the art of ceramics and have been used to produce ceramic monoliths.

Desirably, the honeycomb structure of the monolith 10 has an open frontal area greater than 70 percent and up to about 85 percent, and desirably about 73.8 percent, after drying and firing. The open frontal area of the monolith is the percentage of open area of the monolith taken across a plane substantially perpendicular to the length of the monolith. Furthermore, the monolith 10 desirably has a honeycomb pattern with square cells and about 540 cells per square inch. The honeycomb structure desirably has a cell-to-cell pitch of about 0.043 inches, a cell wall thickness of about 6 mils, and an open frontal area of about 0.0014 square inches per cell. More broadly, for a variety of applications, the cell density may vary from 1 to 800 cells per square inch or higher, with the cell wall thickness ranging from about 150 mils to about 5 mils and the cell-to-cell pitch varying from about 1 to about 0.035 inches.

The extruded honeycomb monolith 10 is dried in a manner so as to prevent cracking of the structure. To alleviate cracking, the monolith is dried so that water is removed at substantially the same rate throughout the monolith. Preferred drying methods include vacuum drying, freeze drying and humidity control drying. More conventional drying methods can be used to dry the monolith of the present invention but are less practical commercially. Such conventional methods include dielectric drying and warm air drying with the monolith wrapped in plastic.

Vacuum drying of the extruded honeycomb monolith includes placing the extruded monolith in a vacuum chamber initially having ambient room temperature and atmospheric pressure within the vacuum chamber, reducing the pressure within the vacuum chamber at a rate and to a level sufficient to quickly freeze the water in the monolith, and maintaining a reduced pressure within the vacuum chamber for a time sufficient for the frozen water in the monolith to sublime until the monolith is dried. This drying cycle may be interrupted temporarily to remove the monolith to another chamber after the monolith has been frozen. Freezing of the water in the monolith immobilizes the water and stabilizes the size and shape of the monolith. The initial vacuum desirably is a deep vacuum to quickly and uniformly freeze the monolith. The vacuum freezes the monolith more uniformly than if the monolith were frozen in a cold chamber at atmospheric pressure. After freezing, the monolith may then be moved to a second chamber which does not require quite as deep a vacuum as the first chamber. Sublimation can be completed in this second chamber. Desirably, during vacuum drying, the pressure within the vacuum chamber is reduced, within about 1 minute, from atmospheric pressure to a pressure less than about 1 torr, and desirably within the range from 30 microns to 1 torr. Alternatively, this second chamber can be at atmospheric pressure and sub-freezing temperature and the frozen monolith can be dried with recirculating dehumidified air.

Freeze drying of the extruded honeycomb monolith is carried out in the same manner as vacuum drying except that the structure is flash frozen before being placed into a vacuum chamber for drying by sublimation. The wet monolith is frozen by placing the wet monolith in a super cold chamber cooled by liquid nitrogen or other means known by those skilled in the art. Desirably, the temperature of the chamber is $-25°$ F. or lower, and more desirably $-80°$ F. or lower, with a circulating air or gaseous environment. Alternatively, the monolith may be flooded with or dipped into super cold liquid such as liquid nitrogen to freeze the monolith.

During the drying stage of freeze drying or vacuum drying wherein the monolith is subjected to a vacuum, the temperature of the monolith may be varied by application of energy by radiation, conduction, convection, or RF or microwave energy independently during drying to enhance water removal. Vacuum levels similar to those used for vacuum drying are used. The temperature of the monolith should be maintained at or below a maximum of $32°$ F. to avoid non-uniform water loss and cracking.

Humidity control drying of the wet extruded honeycomb monolith includes placing the extruded wet monolith in a chamber initially having a relative humidity within the chamber of at least 92 percent and gradually reducing the relative humidity within the chamber until the monolith is dried. Desirably, the initial relative humidity level in the chamber should be 98 percent or higher. The humidity in the chamber can be lowered in stages to effect substantially uniform moisture loss throughout the monolith during each drying stage. The humidity conditioned air is circulated through the drying chamber and the passages of the honeycomb monolith to ensure a uniform rate of moisture removal throughout the monolith. The temperature within the chamber may be varied to enhance the drying action.

After drying, the dried extruded honeycomb monolith is fired at a temperature from about 1600 to about 1900° F and desirably from about 1850 to about 1900° F., in a nitrogen or other non-oxidizing or slightly reducing atmosphere. The monolith should be fired at a temperature sufficient to react the ceramic forming materials together to create a matrix for holding the activated carbon and maintaining the honeycomb shape of the extrusion. The bonds created by the firing should be sufficient to create a matrix having a strength able to withstand handling and use of the monolith in intended applications such as in an ozone filter for a xerographic device, a fuel adsorber in an automobile air intake system, or a catalyst support. When used as a catalyst support, the monolith of the present invention can be coated with conventional catalyst coatings using conventional coating methods. The relatively high surface area of the material forming the monolith of the present invention makes it desirable as a catalyst support.

In a desired embodiment, the monolith is made by extruding a mixture comprising: 30 parts, by weight, activated carbon; 50 parts, by weight, ball clay; 10 parts, by weight, calcined kaolin clay; 10 parts, by weight, nepheline syenite; 2.5 parts, by weight, methylcellulose; 2.8 parts, by weight, sodium silicate solids; and 75 parts, by weight, water. The resulting honeycomb monolith has a high structural integrity, exhibiting axial crushing strength of about 1500 psi and a modulus of rupture (MOR) of about 150 psi in the axial direction.

It should be understood that carbon-containing ceramic monoliths of this invention can be used in a variety of applications owing to the wide range of carbon content which the monoliths can contain. For example, monolith crushing strengths will vary depending on the relative amounts of carbon and ceramic forming material, the firing temperature, and the particle size of the ingredients. In particular, a monolith for use as an automotive air intake VOC adsorption product demands a higher strength and a carbon content from about 25 to about 35%, by weight, while a monolith for use as an ozone depleter demands a higher strength and a carbon content from about 45 to about 60%, by weight. The axial crushing strength for an automotive air intake VOC adsorption product containing 25% carbon, by weight, ranges from 1200 to 1600 psi and the axial crushing strength for an ozone depleter containing 50% carbon, by weight, ranges from 500 to 1000 psi.

The following examples are designed to teach those of ordinary skill in the art how to practice this invention:

EXAMPLE

Four formulations (A–D) of dry ingredients as shown in Table 1 were dry blended for about 4 minutes. An appropriate amount of water to make an extrudable mixture was added, and the ingredients wet mixed in a high energy mixer for about 5 minutes until a mixture with acceptable extrusion properties was obtained.

TABLE 1

| | Formulation in parts by weight | | | |
|---|---|---|---|---|
| Ingredient | A | B | C | D |
| activated carbon[1] | 50 | 50 | 30 | 30 |
| ball clay[2] | 42 | 36 | 58 | 50 |
| calcined kaolin[3] | 8 | 7 | 12 | 10 |
| nepheline syenite[4] | — | 7 | — | 10 |
| sodium silicate[5] (solids from aqueous solution) | — | 4.5 | — | 2.8 |
| methyl cellulose[6] | 3 | 3 | 2.5 | 2.5 |
| water | 83 | 102 | 66 | 75 |

[1]Available from Westvaco Corporation of New York, New York and having a BET surface area of 1500 m²/g and a particle size distribution such that 65 to 85% are less than 325 mesh, 85 to 95% are less than 200 mesh, and 95 to 100% are less than 100 mesh.
[2]Available from Kentucky & Tennessee Clay Co. of Mayfield, Kentucky under the designation OLD MINE #4 Ball Clay.
[3]Available from Georgia Kaolin of Union, New Jersey under the designation GLOMAX LL.
[4]Available from Unimin Specialty Materials of Elco, Illinois under the trademark MINEX ®.
[5]Available from PQ Corporation, Industrial Chemicals Division of Valley Forge, Pennsylvania in solution form with 40% solids, Type N.
[6]Available from Dow Chemical Corporation of Midland, Missouri under the designation A4M.

The four mixtures were then individually extruded through honeycomb extrusion dies to form wet molded honeycomb structures, wrapped in multiple layers of plastic film to retard moisture loss, and dried in a warm air dryer at about 180 degrees F. for 24 hours.

When the monoliths were sufficiently dry, four samples were cut from each of the monoliths made from Formulations A–D. The samples were cut perpendicular to the direction of the monolith passages and had a thickness of 12 mm. These samples were then fired to the temperatures shown in Table 2 for a time period of one half to one hour in an electric furnace purged with an inert atmosphere, and comparative results for axial crushing strength and apparent density were determined. These results are depicted in FIGS. 3 and 4, respectively.

TABLE 2

| | Firing Temperature (° F.) | | | |
|---|---|---|---|---|
| Formulation | Sample 1 | Sample 2 | Sample 3 | Sample 4 |
| A | 1400 | 1600 | 1800 | 2000 |
| B | 1400 | 1600 | 1800 | 2000 |
| C | 1400 | 1600 | 1800 | 2000 |
| D | 1400 | 1600 | 1800 | 2000 |

Figure 3:
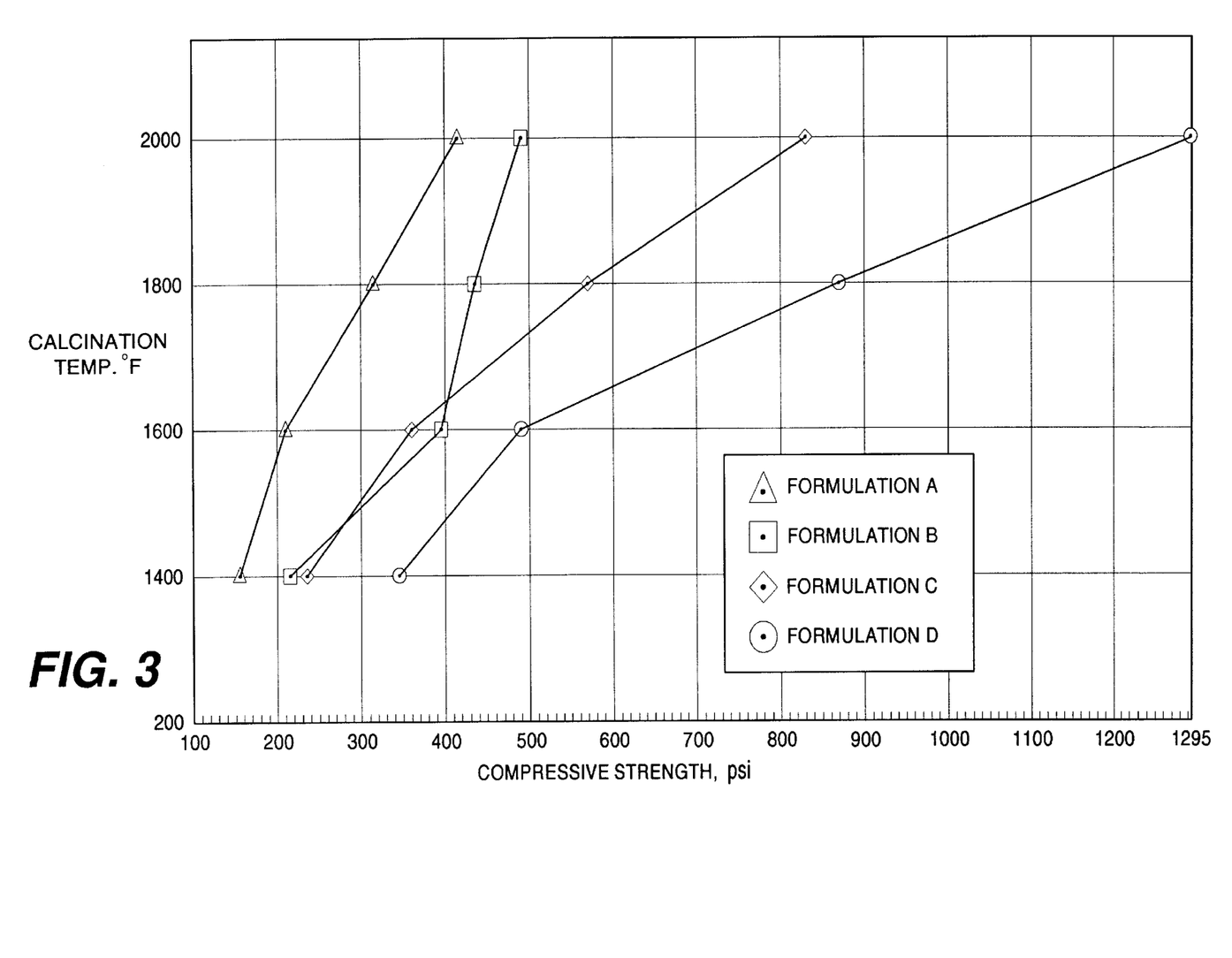
FIG. 3 is a graph comparing the axial crushing strength of monoliths made in accordance with embodiments of this invention with that of monoliths made without flux material.
Figure 4:
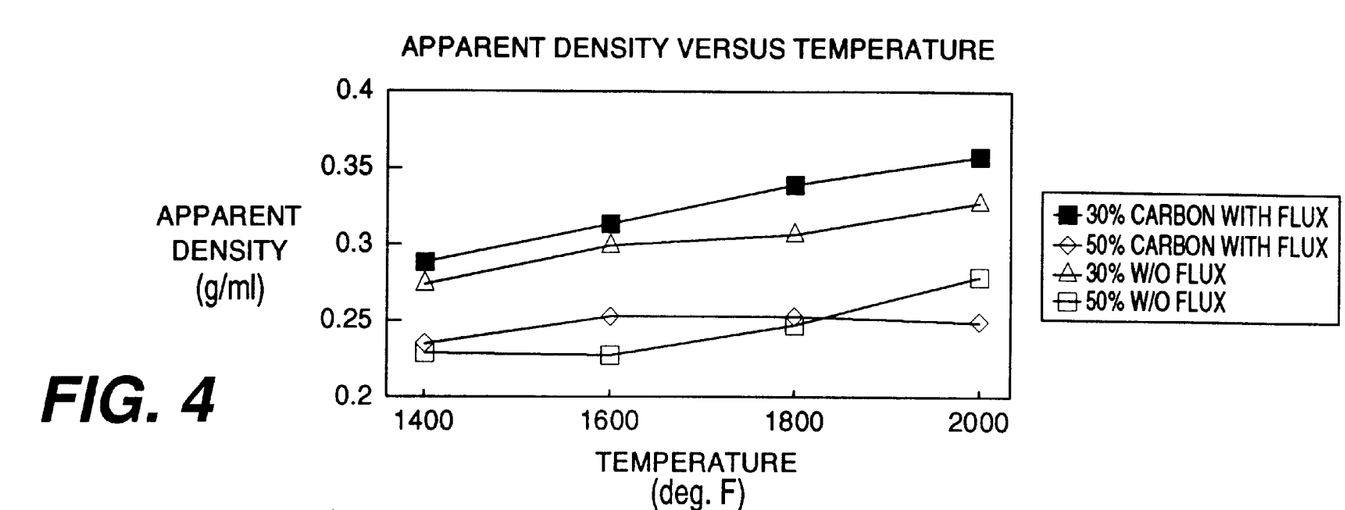
FIG. 4 is a graph comparing the apparent density of monoliths made in accordance with embodiments of this invention with that of monoliths made without flux material.

FIG. 3 compares the axial crushing strengths of 200 cpsi monoliths containing 30% activated carbon and 540 cpsi monoliths containing 50% activated carbon, both with and without nepheline syenite and sodium silicate as flux material. The axial crushing strength was measured according to ASTM C695-91. It can be seen that Formulations C and D containing 30% activated carbon display significantly higher axial crushing strength than de Formulations A and B, which contain 50% activated carbon and correspondingly lower amounts of ceramic forming materials. Furthermore, it can be seen that the addition of flux material increases the strength of the monolith over monoliths which have the same amount of carbon and approximately the same amount of ceramic forming material and are fired at the same temperature. Specifically, FIG. 3 shows that the monolith of Formulation B, which included 50 parts by weight carbon, and flux material, had superior strength than the monolith of Formulation A, which included 50 parts by weight carbon, and no flux material. Both the monolith of Formulation A and the monolith of Formulation B were fired at the same temperature. Likewise, FIG. 3 shows similar results for the monoliths of Formulations C and D. Formulation C included 30 parts by weight carbon, and no flux material, and Formulation D included 30 parts by weight carbon, and flux material. This results in the same strength potential for similar formulations when fired at lower processing temperatures with the incorporation of flux material.

FIG. 4 compares apparent density values of the samples from the monoliths made according to each of the formulations and fired at the various firing temperatures. The apparent density was measured according to ASTM C838-91 on samples having dimensions of 12 mm×12 mm×12 mm, regular parallelpiped cut to eliminate the monolith skin. All formulations show an increase in apparent density with increase in firing temperature. This increase in apparent density results from formation of ceramic structure from the ceramic forming materials present. FIG. 4 shows higher density in both formulations containing 30% activated carbon and correspondingly higher amounts of ceramic forming materials than the formulations containing 50% activated carbon. Also, particularly in Formulation D, the flux containing formulations display an increase in apparent density over the formulations not containing the flux materials.

The foregoing description relates to embodiments of the present invention, and changes and modifications may be made therein without departing from the scope of the invention as defined in the following claims.

We claim:
1. A method of forming an adsorptive monolith comprising the steps of:
  (a). extruding an extrudable mixture through an extrusion die such that a monolith is formed having a shape wherein the monolith has at least one passage therethrough and the extrudable mixture comprises:
    activated carbon;
    ceramic forming material;

flux material; and water, the mixture being capable of maintaining the shape of the monolith after extrusion and during drying of the monolith;

(b). drying the extruded monolith; and (c). firing the dried monolith at a temperature and for a time period sufficient to fuse the ceramic material together and form a ceramic matrix.

2. A method as in claim 1 wherein the extrudable mixture comprises a wet binder for enhancing strength and maintaining the shape of the wet extruded monolith.

3. A method as in claim 1 wherein the ceramic forming material comprises a filler for reducing shrinkage of the monolith during the steps of drying and firing.

4. A method as in claim 1 wherein the extrudable mixture comprises a wet binder for enhancing strength and maintaining the shape of the wet extruded monolith and the ceramic forming material comprises a filler for reducing shrinkage of the monolith during the steps of drying and firing.

5. A method as in claim 1 wherein the ceramic forming material comprises ball clay.

6. A method as in claim 1 wherein the flux comprises a feldspathic mineral.

7. A method as in claim 1 wherein the flux comprises nepheline syenite.

8. A method as in claim 2 wherein the binder comprises methylcellulose.

9. A method as in claim 8 wherein the binder further comprises an acrylic binder.

10. A method as in claim 1 wherein the extrudable mixture further comprises sodium silicate.

11. A method as in claim 3 wherein the ceramic forming material filler comprises calcined kaolin clay.

12. A method as in claim 1 wherein the ceramic forming material comprises ball clay and the flux comprises a feldspathic mineral.

13. A method as in claim 12 wherein the feldspathic mineral is nepheline syenite.

14. A method as in claim 4 wherein the ceramic forming material comprises ball clay, the flux comprises a feldspathic mineral, the binder comprises methylcellulose, and the ceramic forming material filler comprises calcined kaolin clay.

15. A method as in claim 14 wherein the feldspathic mineral is nepheline syenite.

16. A method as in claim 14 wherein the extrudable mixture further comprises sodium silicate.

17. A method as in claim 14 wherein the binder further comprises an acrylic binder.

18. A method as in claim 1 wherein:

the activated carbon is present in the extrudable mixture in an amount from about 20 to about 70 parts, by weight;

the ceramic forming material is present in the extrudable mixture in an amount from about 20 to about 60 parts, by weight; and the flux material is present in the extrudable mixture in an amount from about 4 to about 20 parts, by weight.

19. A method as in claim 18 wherein the extrudable mixture comprises a wet binder in an amount from about 0.5 to about 5 parts, by weight, for enhancing strength and maintaining the shape of the wet extruded monolith.

20. A method as in claim 18 wherein the ceramic forming material comprises a filler present in the extrudable mixture in an amount from about 1 to about 15 parts, by weight, for reducing shrinkage of the monolith during the steps of drying and firing.

21. A method as in claim 18 wherein the extrudable mixture comprises a wet binder in an amount from about 0.5 to about 5 parts, by weight, for enhancing strength and maintaining the shape of the wet extruded monolith and the ceramic forming material comprises a filler present in the extrudable mixture in an amount from about 1 to about 15 parts, by weight, for reducing shrinkage of the monolith during the steps of drying and firing.

22. A method as in claim 18 wherein the ceramic forming material is ball clay.

23. A method as in claim 18 wherein the flux is a feldspathic mineral.

24. A method as in claim 23 wherein the feldspathic mineral is nepheline syenite.

25. A method as in claim 18 wherein the extrudable mixture further comprises methylcellulose present in an amount from about 0.5 to about 5 parts, by weight.

26. A method as in claim 18 wherein the extrudable mixture further comprises methylcellulose present in an amount from about 0.5 to about 5 parts, by weight, and an acrylic binder present in an amount from about 1 to about 4 parts solid, by weight.

27. A method as in claim 18 wherein the extrudable mixture further comprises sodium silicate solids in an amount from about 2 to about 7 parts.

28. A method as in claim 20 wherein the ceramic forming material filler is calcined kaolin clay.

29. A method as in claim 18 wherein the ceramic forming material is ball clay and the flux is a feldspathic mineral.

30. A method as in claim 29 wherein the feldspathic mineral is nepheline syenite.

31. A method as in claim 1 wherein:

the activated carbon is present in the extrudable mixture in an amount from about 20 to about 70 parts, by weight;

the ceramic forming material comprises ball clay present in the extrudable mixture in an amount from about 20 to about 60 parts, by weight;

the flux is a feldspathic mineral present in the extrudable mixture in an amount from about 4 to about 20 parts, by weight;

the extrudable mixture further comprises methylcellulose present in the extrudable mixture in an amount from about 0.5 to about 5 parts, by weight;

the ceramic forming material further comprises calcined kaolin clay present in the extrudable mixture in an amount from about 1 to about 15 parts, by weight; and the water is present in the extrudable mixture in an amount from about 60 to about 130 parts, by weight.

32. A method as in claim 31 wherein the feldspathic mineral is nepheline syenite.

33. A method as in claim 31 wherein the extrudable mixture further comprises sodium silicate in an amount from about 2 to 7 parts, by weight.

34. A method as in claim 1 wherein:

the activated carbon is present in the extrudable mixture in an amount from about 20 to about 70 parts, by weight;

the ceramic forming material comprises ball clay present in the extrudable mixture in an amount from about 20 to about 60 parts, by weight;

the flux material is nepheline syenite present in the extrudable mixture in an amount from about 4 to about 20 parts, by weight;

the extrudable mixture further comprises methylcellulose present in the extrudable mixture in an amount from about 0.5 to about 5 parts, by weight;

the extrudable mixture further comprises an acrylic binder present in the extrudable mixture in an amount from about 1 to about 4 parts solids, by weight;

the ceramic forming material further comprises calcined kaolin clay present in the extrudable mixture in an amount from about 1 to about 15 parts, by weight;

the extrudable mixture further comprises sodium silicate solids present in the extrudable mixture in an amount from about 2 to about 7 parts; and the water is present in the extrudable mixture in an amount from about 60 to about 130 parts, by weight.

35. A method as in claim 1 wherein, during the extrusion step, the extrudable mixture is extruded through an extrusion die such that a monolith is formed having a shape wherein the monolith has a plurality of passages therethrough.

36. A method as in claim 35 wherein the monolith and said plurality of passages form a honeycomb shape.

37. A method as in claim 36 wherein the monolith has an open frontal area greater than 70% and up to about 85%.

38. A method as in claim 1 wherein the monolith is fired at a temperature from about 1600 to about 1900° F. in a nonoxidative atmosphere.

39. A method as in claim 38 wherein the monolith is fired for a period from about 0.5 to less than 1 hour.

40. A method as in claim 1 wherein the drying step comprises the steps of:

placing the extruded monolith in a vacuum chamber initially having ambient room temperature and atmospheric pressure within the vacuum chamber;

reducing the pressure within the vacuum chamber at a rate and to a level sufficient to freeze the water in the monolith; and maintaining the reduced pressure within the vacuum chamber for a time sufficient for the frozen water in the monolith to sublime until the monolith is dry.

41. A method as in claim 40 wherein, during the step of reducing pressure, the pressure within the vacuum chamber is reduced from atmospheric pressure to a pressure of less than about 1 torr.

42. A method as in claim 40 wherein, during the step of reducing pressure, the pressure within the vacuum chamber is reduced from atmospheric pressure to a pressure of less than about 1 torr within about 1 minute.

43. A method as in claim 1 wherein the drying step comprises the steps of:

freezing the water in the extruded monolith;

placing the frozen extruded monolith in a vacuum chamber initially having a pressure within the vacuum chamber of atmospheric pressure;

reducing the pressure and/or temperature within the vacuum chamber at a rate and to a level sufficient to keep the water in the monolith frozen; and/or maintaining the reduced pressure and/or temperature within the vacuum chamber for a time sufficient for the frozen water in the monolith to sublime until the monolith is dry.

44. A method as in claim 43 wherein, during the freezing step, the water in the monolith is frozen within about 10 minutes after the extrusion step.

45. A method as in claim 43 wherein, during the freezing step, the monolith is subjected to a temperature of less than about minus 250 F.

46. A method as in claim 43 wherein, during the freezing step, the monolith is subjected to a temperature of less than about minus 80° F.

47. A method as in claim 1 wherein the drying step comprises the steps of:

placing the extruded monolith in a chamber initially having a relative humidity within the chamber of at least 95%; and gradually reducing the relative humidity within the chamber until the monolith is dry.

48. a method as in claim 1 wherein the monolith after the step of firing has a cell density of from 1 to 800 cells/in$^2$ and an open frontal area greater than 70% and up to about 85%.

49. A method as in claim 1 wherein the activated carbon is derived from materials selected from the group consisting of bituminous coal, lignite, peat, synthetic polymers, petroleum pitch, petroleum coke, coal tar pitch, and lignocellulosic materials.

50. A method as in claim 1 wherein the activated carbon is derived from lignocellulosic materials selected from the group consisting of wood, wood dust, wood flour, sawdust, coconut shell, fruit pits, nut shell, and fruit stones.

51. A method as in claim 1 wherein the activated carbon is characterized by a nitrogen B.E.T. surface area from about 600 to about 2000 m$^2$/g.

52. A method as in claim 1 wherein the activated carbon in characterized by a nitrogen B.E.T. surface area from about 800 to 1800 m$^2$/g.

53. A method as in claim 1 wherein the activated carbon is characterized by a nitrogen B.E.T. surface area from about 1000 to 1600 m$^2$/g.

54. A method as in claim 1 wherein the activated carbon is characterized by having a particle size such that more than 40% by weight of the activated carbon passes through a 325 mesh screen.

55. A method as a in claim 1 wherein the activated carbon is characterized by having a particle size such that more than 65% by weight of the activated carbon passes through a 325 mesh screen.

56. An adsorptive monolith made according to a process comprising the steps of:

(a). extruding an extrudable mixture through an extrusion die such that a monolith is formed having a shape wherein the monolith has at least one passage therethrough and the extrudable mixture comprises:

activated carbon;

ceramic forming material;

flux material; and water, the mixture being capable of maintaining the shape of the monolith after extrusion and during drying of the monolith;

(b). drying the extruded monolith; and (c). firing the dried monolith at a temperature and for a time period sufficient to fuse the ceramic material together and form a ceramic matrix.

57. A method for drying a wet extruded monolith comprising activated carbon, ceramic forming material, and water comprising the steps of:

placing the wet extruded monolith in a vacuum chamber initially having atmospheric temperature and pressure within the vacuum chamber;

reducing the pressure within the vacuum chamber at a rate and to a level sufficient to freeze the water in the monolith; and maintaining the reduced pressure within the vacuum chamber for a time sufficient for the frozen water in the monolith to sublime until the monolith is dry.

58. A method as in claim 57 wherein, during the step of reducing pressure, the pressure within the chamber is reduced from atmospheric pressure to a pressure-of less than about 1 torr.

59. A method as in claim 57 wherein, during the step of reducing pressure, the pressure within the chamber is reduced from atmospheric pressure to a pressure of less than about 1 torr within about 1 minute.

60. A method for drying a wet extruded monolith comprising activated carbon, ceramic forming material, and water comprising the steps of:

freezing the water in the extruded monolith;

placing the frozen extruded monolith in a vacuum chamber initially having a pressure within the vacuum chamber of atmospheric pressure;

reducing the pressure and/or temperature within the vacuum chamber at a rate and to a level sufficient to keep the water in the monolith frozen; and maintaining the reduced pressure and/or temperature within the vacuum chamber for a time sufficient for the frozen water in the monolith to sublime until the monolith is dry.

61. A method as in claim 60 wherein, during the freezing step, the water in the monolith is frozen within about 10 minutes after the extrusion step.

62. A method as in claim 60 wherein, during the freezing step, the monolith is subjected to a temperature of less than about minus 25° F.

63. A method as in claim 60 wherein, during the freezing step, the monolith is subjected to a temperature of less than about minus 80° F.

* * * * *